(12) United States Patent
Barr et al.

(10) Patent No.: US 12,348,961 B2
(45) Date of Patent: *Jul. 1, 2025

(54) BLUETOOTH DEVICE AUTHENTICATION OVER BLUETOOTH ADVERTISEMENTS

(71) Applicant: Schlage Lock Company LLC, Carmel, IN (US)

(72) Inventors: Matthew Barr, Indianapolis, IN (US); Andrew Setter, Carmel, IN (US); Paul Avgerinos, Carmel, IN (US); Joseph W. Baumgarte, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,194

(22) Filed: Sep. 12, 2023

(65) Prior Publication Data

US 2025/0008324 A1 Jan. 2, 2025

Related U.S. Application Data

(63) Continuation of application No. 16/841,724, filed on Apr. 7, 2020, now Pat. No. 11,758,396.

(51) Int. Cl.
*H04L 29/06* (2006.01)
*H04L 9/32* (2006.01)
(Continued)

(52) U.S. Cl.
CPC ........... *H04W 12/06* (2013.01); *H04L 9/3271* (2013.01); *H04W 4/80* (2018.02); *H04W 12/037* (2021.01);
(Continued)

(58) Field of Classification Search
CPC ..... H04W 12/06; H04W 4/80; H04W 12/037; H04W 12/0431; H04W 76/11; H04L 9/3271
See application file for complete search history.

(56) References Cited

U.S. PATENT DOCUMENTS 3,634,019 A * 1/1972 Beaumont ........... D06M 15/423
8/185
8,274,365 B2 * 9/2012 Piccirillo ................ E05B 67/00
340/5.74
(Continued)

FOREIGN PATENT DOCUMENTS

| EP | 2815553 B1 | 12/2014 |
| EP | 3634019 B1 | 10/2021 |
| WO | 2019120493 A1 | 6/2019 |

OTHER PUBLICATIONS

International Search Report; International Searching Authority; International Patent Application No. PCT/US2021/026185; Oct. 1, 2021; 2 pages.

(Continued)

*Primary Examiner* — Harunur Rashid
(74) *Attorney, Agent, or Firm* — Taft Stettinius & Hollister LLP

(57) ABSTRACT

A method of authenticating a mobile device over Bluetooth advertisements according to one embodiment includes broadcasting, by an access control device, a first Bluetooth advertisement including a challenge message generated by the access control device, receiving, by the mobile device, the first Bluetooth advertisement including the challenge message, broadcasting, by the mobile device, a second Bluetooth advertisement including a challenge response message generated by the mobile device based on the challenge message, receiving, by the access control device, the second Bluetooth advertisement including the challenge response message, and determining, by the access control device, whether the mobile device is authorized to perform an action with respect to the access control device by verifying the challenge response message.

20 Claims, 5 Drawing Sheets

(51) Int. Cl.
   *H04W 4/80*       (2018.01)
   *H04W 12/037*     (2021.01)
   *H04W 12/0431*    (2021.01)
   *H04W 12/06*      (2021.01)
   *H04W 76/11*      (2018.01)

(52) U.S. Cl.
   CPC ........ *H04W 12/0431* (2021.01); *H04W 76/11* (2018.02)

(56) References Cited

U.S. PATENT DOCUMENTS

| | | | |
|---|---|---|---|
| 2008/0119184 A1* | 5/2008 | Rebo | H04L 63/162 |
| | | | 455/433 |
| 2013/0099892 A1 | 4/2013 | Tucker et al. | |
| 2013/0174252 A1 | 7/2013 | Weber et al. | |
| 2016/0036594 A1* | 2/2016 | Conrad | G06F 21/35 |
| | | | 713/185 |
| 2016/0042581 A1 | 2/2016 | Ku | |
| 2018/0283051 A1* | 10/2018 | Qiu | G06K 19/0723 |
| 2019/0182672 A1* | 6/2019 | Kuenzi | H04W 12/084 |
| 2020/0007339 A1* | 1/2020 | Li | H04L 9/3234 |
| 2021/0097795 A1* | 4/2021 | Manchovski | H04L 63/108 |

OTHER PUBLICATIONS

Written Opinion; International Searching Authority; International Patent Application No. PCT/US2021/026185; Oct. 1, 2021; 5 pages.

\* cited by examiner

BLUETOOTH DEVICE AUTHENTICATION OVER BLUETOOTH ADVERTISEMENTS

CROSS REFERENCE TO RELATED APPLICATIONS

The present application is a continuation of U.S. patent application Ser. No. 16/841,724 filed Apr. 7, 2020 and issued as U.S. Pat. No. 11,758,396, the contents of which are incorporated herein by reference in their entirety.

BACKGROUND

Some modern access control systems allow users to lock and unlock electronic locks and/or otherwise interact with access control devices using their smartphones or other handheld mobile devices. The techniques used to securely pair a mobile device with an access control device may vary depending, for example, on the operating system executed by the mobile device, the security framework/protocol employed by the mobile device, and/or other factors. A typical Bluetooth authentication process includes to scan for advertisements, negotiate a connection with the peripheral device, retry unsuccessful connection attempts, discover services of the peripheral device, and authenticate. However, each of those steps can increase the time for the corresponding devices to connect. For example, a low peripheral advertising rate can increase the time to scan, the central device may fail several connection attempts, the peripheral device may have many services (e.g., complex services), and/or the central device's operating system may not be allowed to cache service discovery information (e.g., requiring a service discovery for each connection). In total, the Bluetooth connection process typically takes several hundred milliseconds to a second or more, not even including the time required to authenticate.

SUMMARY

One embodiment is directed to a unique system, components, and methods for Bluetooth device authentication over Bluetooth advertisements. Other embodiments are directed to apparatuses, systems, devices, hardware, methods, and combinations thereof for Bluetooth device authentication over Bluetooth advertisements.

According to an embodiment, a method of authenticating a mobile device over Bluetooth advertisements may include broadcasting, by an access control device, a first Bluetooth advertisement including a challenge message generated by the access control device, receiving, by the mobile device, the first Bluetooth advertisement including the challenge message, broadcasting, by the mobile device, a second Bluetooth advertisement including a challenge response message generated by the mobile device based on the challenge message, receiving, by the access control device, the second Bluetooth advertisement including the challenge response message, and determining, by the access control device, whether the mobile device is authorized to perform an action with respect to the access control device by verifying the challenge response message.

In some embodiments, the method may further include generating, by the mobile device, the challenge response message by cryptographically signing the challenge message with a private key of the mobile device.

In some embodiments, the challenge response message may include a unique identifier of the mobile device.

In some embodiments, verifying the challenge response message may include verifying the signed challenge message using a public key of the mobile device stored on the access control device.

In some embodiments, the method may further include establishing a Bluetooth protocol connection between the mobile device and the access control device, and exchanging data for secure authentication between the mobile device and the access control device.

In some embodiments, exchanging the data for secure authentication between the mobile device and the access control device may include transmitting the unique identifier of the mobile device and the public key of the mobile device to the access control device.

In some embodiments, verifying the signed challenge message may include identifying the public key of the mobile device stored on the access control device based on the unique identifier of the mobile device extracted from the challenge response message.

In some embodiments, the method may further include unlocking a lock mechanism associated with the access control device in response to verifying the challenge response message.

According to another embodiment, an access control system may include an access control device configure to broadcast a first Bluetooth advertisement including a challenge message generated by the access control device and a mobile device configured to receive the first Bluetooth advertisement including the challenge message and broadcast a second Bluetooth advertisement including a challenge response message generated by the mobile device based on the challenge message, and wherein the access control device is further configured to receive the second Bluetooth advertisement including the challenge response message and verify the challenge response message to determine whether the mobile device is authorized to perform an action with respect to the access control device.

In some embodiments, the mobile device may be configured to generate the challenge response message by cryptographically signing the challenge message with a private key of the mobile device.

In some embodiments, the challenge response message may include a unique identifier of the mobile device.

In some embodiments, to verify the challenge response message may include to verify the signed challenge message using a public key of the mobile device stored on the access control device.

In some embodiments, the access control device may be configured to establish a Bluetooth protocol connection with the mobile device and exchange data with the mobile device for subsequent secure authentication of the mobile device.

In some embodiments, to exchange the data for subsequent secure authentication of the mobile device may include to receive the unique identifier of the mobile device and the public key of the mobile device.

In some embodiments, to verify the signed challenge message may include to identify the public key of the mobile device stored on the access control device based on the unique identifier of the mobile device extracted from the challenge response message.

In some embodiments, the access control system may further include a lock mechanism associated with the access control device, and the access control device may be configured to unlock the lock mechanism in response to verification of the challenge response message.

According to yet another embodiment, an access control device may include at least one processor and at least one memory comprising a plurality of instructions stored thereon that, in response to execution by the at least one processor, causes the access control device to broadcast a first Bluetooth advertisement including a challenge message, receive a second Bluetooth advertisement broadcasted by a mobile device in response to broadcasting the first Bluetooth advertisement, wherein the second Bluetooth advertisement includes a challenge response message generated by the mobile device based on the challenge message, and verify the challenge response message to determine whether the mobile device is authorized to perform an action with respect to the access control device.

In some embodiments, the challenge response message may include a unique identifier of the mobile device and the challenge message cryptographically signed with a private key of the mobile device.

In some embodiments, to verify the challenge response message may include to verify the signed challenge message using a public key of the mobile device stored on the access control device.

In some embodiments, the plurality of instructions may further cause the access control device to establish a Bluetooth protocol connection with the mobile device and exchange data with the mobile device for subsequent secure authentication of the mobile device, wherein to exchange the data for subsequent secure authentication of the mobile device may include to receive the unique identifier of the mobile device and the public key of the mobile device, and wherein to verify the signed challenge message may include to identify the public key of the mobile device stored on the access control device based on the unique identifier of the mobile device extracted from the challenge response message.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
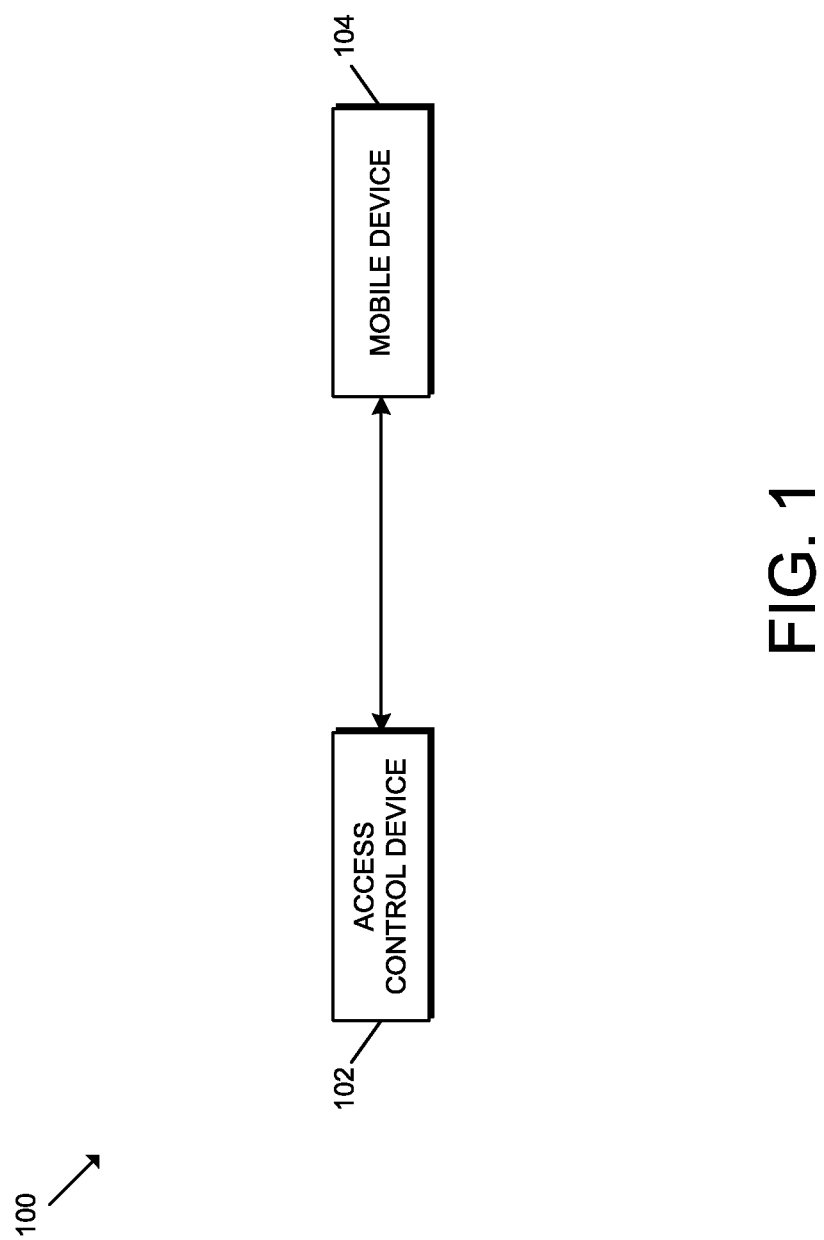
FIG. 1 is a simplified block diagram of at least one embodiment of an access control system for Bluetooth device authentication over Bluetooth advertisements.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, an access control system 100 for Bluetooth device authentication over Bluetooth advertisements includes an access control device 102 and a mobile device 104. Although only one access control device 102 and one mobile device 104 are shown in the illustrative embodiment of FIG. 1, the access control system 100 may include multiple access control devices 102 and/or mobile devices 104 in other embodiments. For example, in practice, the access control device 102 may transmit or broadcast Bluetooth advertisements to any devices within communication range of the access control device 102, which may include multiple mobile devices 104 in the vicinity of the access control device 102. Likewise, the mobile device 104 may transmit or broadcast Bluetooth advertisements to any devices within communication range of the mobile device 104, which may include multiple access control devices 102 in the vicinity of the mobile device 104.

It should be appreciated that the techniques described herein may facilitate, after an initial connection to share/exchange certain data for secure communication, near-immediate authentication between Bluetooth devices by removing the connection step and instead authenticating in the clear via Bluetooth advertisements with cryptographically secured data. In doing so, the need to establish a connection relationship between Bluetooth devices before each authentication is eliminated, thereby eliminating the lengthy Bluetooth connection process to achieve near-immediate authentication.

The access control device 102 may be embodied as any type of device or collection of devices capable of controlling access through a passageway, controlling access to a particular object or set of objects, and/or otherwise performing the functions described herein. For example, in various embodiments, the access control device 102 may be embodied as or include an electronic lock (e.g., a mortise lock, a cylindrical lock, or a tubular lock), an exit device (e.g., a pushbar or pushpad exit device), a door closer, an auto-operator, a motorized latch/bolt (e.g., for a sliding door), barrier control device (e.g., battery-powered), or a peripheral controller of a passageway. In other embodiments, the access control device 102 may be embodied as or include an electronic lock configured to secure an object or set of objects such as a powered or unpowered vehicle (e.g., motorbike, bicycle, etc.), recreational or sporting equipment (e.g., canoe, kayak, snowmobile, etc.), secure container (e.g., locker, etc.), and/or other object(s).

It should be further appreciated that the access control device 102 may include a lock mechanism configured to control access through the passageway and/or other components typical of a lock device. For example, the lock mechanism may include a deadbolt, latch bolt, level, and/or other mechanism adapted to move between a locked state and an unlocked state. In the illustrative embodiment, the access control device 102 is configured to wirelessly communicate with the mobile device 104 via Bluetooth communication to transmit Bluetooth advertisement data, securely pair the access control device 102 with the mobile device 104 (e.g., for an initial exchange of data for subsequent secure communication), and/or exchange data related to the control and/or configuration of the access control device 102 (e.g., to lock or unlock a lock mechanism) by the user of the mobile device 104 (e.g., via Bluetooth advertisements). It should be appreciated that the access control device 102 may include a Bluetooth Low Energy (BLE) or other Bluetooth circuitry, a main microprocessor, and/or other communication circuitry (e.g., Wi-Fi circuitry) depending on the particular embodiment. Although the access control device 102 is described herein as being a device associated with an access control system, in other embodiments, the access control device 102 may be another type of device capable of performing the functions described herein.

In the illustrative embodiment, the mobile device 104 may be embodied as any type of device capable of communicating with the access control device 102 via Bluetooth communication and/or otherwise performing the functions described herein. In some embodiments, the mobile device 104 may execute a mobile application (e.g., a smartphone application, background application, and/or other application) to facilitate execution of one or more of the functions described herein.

It should be appreciated that each of the access control device 102 and/or the mobile device 104 may be embodied as one or more computing devices similar to the computing device 200 described below in reference to FIG. 2. For example, in the illustrative embodiment, each of the access control device 102 and the mobile device 104 includes a processing device 202 and a memory 206 having stored thereon operating logic 208 (e.g., a plurality of instructions) for execution by the processing device 202 for operation of the corresponding device.

Figure 2:
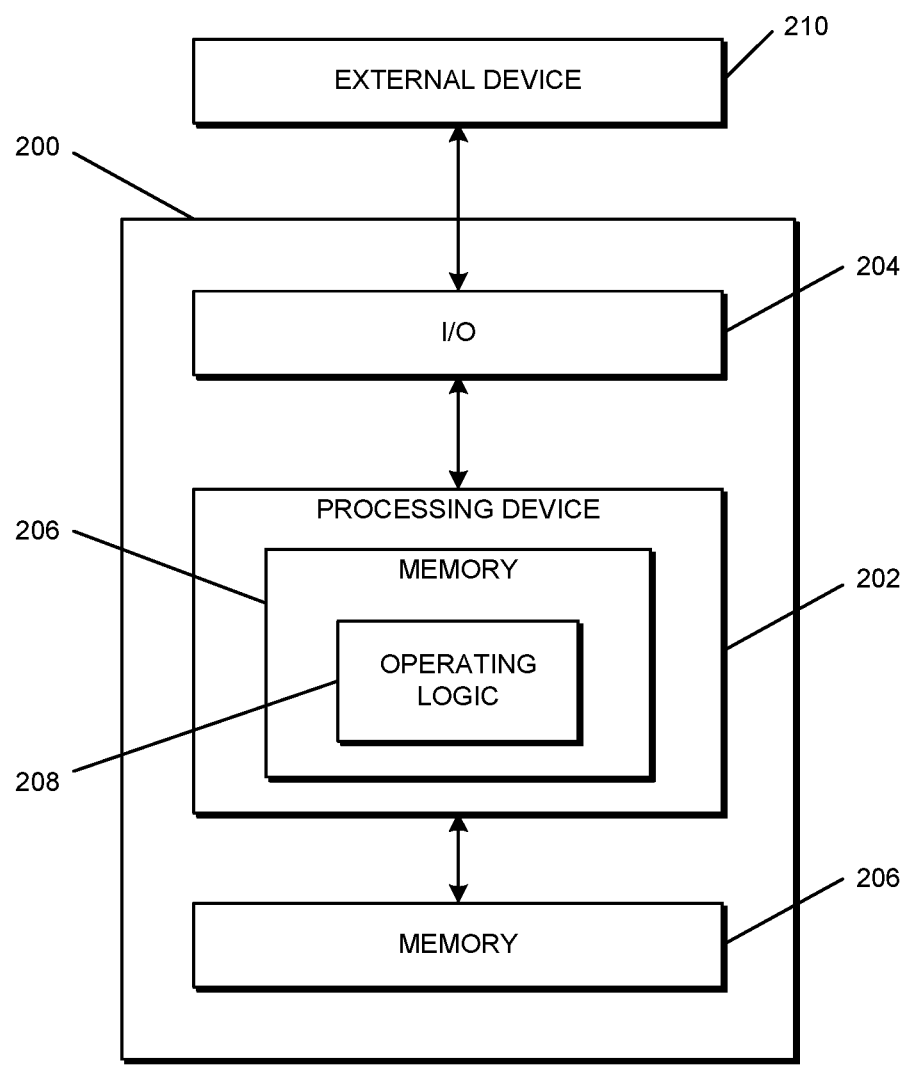
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of an access control device and/or mobile device that may be utilized in connection with the access control device 102 and/or the mobile device 104 illustrated in FIG. 1. Depending on the particular embodiment, the computing device 200 may be embodied as a mobile computing device, server, access control device, desktop computer, laptop computer, tablet computer, notebook, netbook, Ultrabook™, cellular phone, smartphone, wearable computing device, personal digital assistant, Internet of Things (IoT) device, control panel, processing system, wireless access point, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the access control device 102 and/or the mobile device 104. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

As used herein, "Bluetooth" includes traditional Bluetooth Basic Rate/Enhanced Rate (BR/EDR) technology and Bluetooth Low Energy (BLE) technology and refers to one or more components, architectures, communication protocols, and/or other systems, structures, or processes defined by and/or compliant with one or more Bluetooth specifications, addendums, and/or supplements overseen by the Bluetooth Special Interest Group (SIG) including, for example, active, legacy, withdrawn, deprecated, and/or subsequently introduced Bluetooth Core Specifications (CSs) (Bluetooth CS Version 1.0B, Bluetooth CS Version 1.1, Bluetooth CS Version 1.2, Bluetooth CS Version 2.0+EDR, Bluetooth CS Version 2.1+EDR, Bluetooth CS Version 3.0+HS, Bluetooth CS Version 4.0, Bluetooth CS Version 4.1, Bluetooth CS Version 4.2, Bluetooth CS Version 5.0); active, legacy, withdrawn, deprecated, and/or subsequently introduced Bluetooth Core Specification Addendums (CSAs) (Bluetooth CSA Version 1, Bluetooth CSA Version 2, Bluetooth CSA Version 3, Bluetooth CSA Version 4, Bluetooth CSA Version 5, Bluetooth CSA Version 6); Bluetooth Core Specification Supplements (CSSs) (Bluetooth CSS Version 1, Bluetooth CSS Version 2, Bluetooth CSS Version 3, Bluetooth CSS Version 4, Bluetooth CSS Version 5, Bluetooth CSS Version 6, Bluetooth CSS Version 7); active, legacy, withdrawn, deprecated, and/or subsequently introduced Bluetooth Mesh Networking Specifications (Bluetooth Mesh Profile Specification 1.0, Bluetooth Mesh Model Specification 1.0, Bluetooth Mesh Device Properties 1.0); active, legacy, withdrawn, deprecated, and/or subsequently introduced Bluetooth Traditional Profile Specifications (3DSP, A2DP, AVRCP, BIP, BPP, CTN, DI, DUN, FTP, GAVDP, GNSS, GOEP, GPP, HCRP, HDP, HFP, HID, HSP, MAP, MPS, OPP, PAN, PBAP, SAP, SPP, SYNCH, VDP); active, legacy, withdrawn, deprecated, and/or subsequently introduced Bluetooth Protocol Specifications (AVCTP, AVDTP, BNEP, IrDA, MCAP, RFCOMM, 3WIRE, SD, TCP, UART, USB, WAPB); active, legacy, withdrawn, deprecated, and/or subsequently introduced Bluetooth Generic Attribute Profile (GATT) services, characteristics, declarations, descriptors, and profiles (ANP, ANS, AIOP, AIOS, BAS, BCS, BLP, BLS, BMS, CGMP, CGMS, CPP, CPS, CSCP, CSCS, CTS, DIS, ESP, ESS, FMP, FTMP, FTMS, GSS, GLP, GLS, HIDS, HOGP, HPS, HRP, HRS, HTP, HTS, IAS, IDP, IDS, IPS, IPSP, LLS, LNP, LNS, NDCS, OTP, OTS, PASP, PASS, PXP, PLXP, PLXS, RCP, RCS, RSCP, RSCS, TRUS, ScPP, ScPS, TDS, TIP, TPS, UDS, WSP, WSS); and/or other Bluetooth specifications, addendums, and/or supplements.

Figure 3:
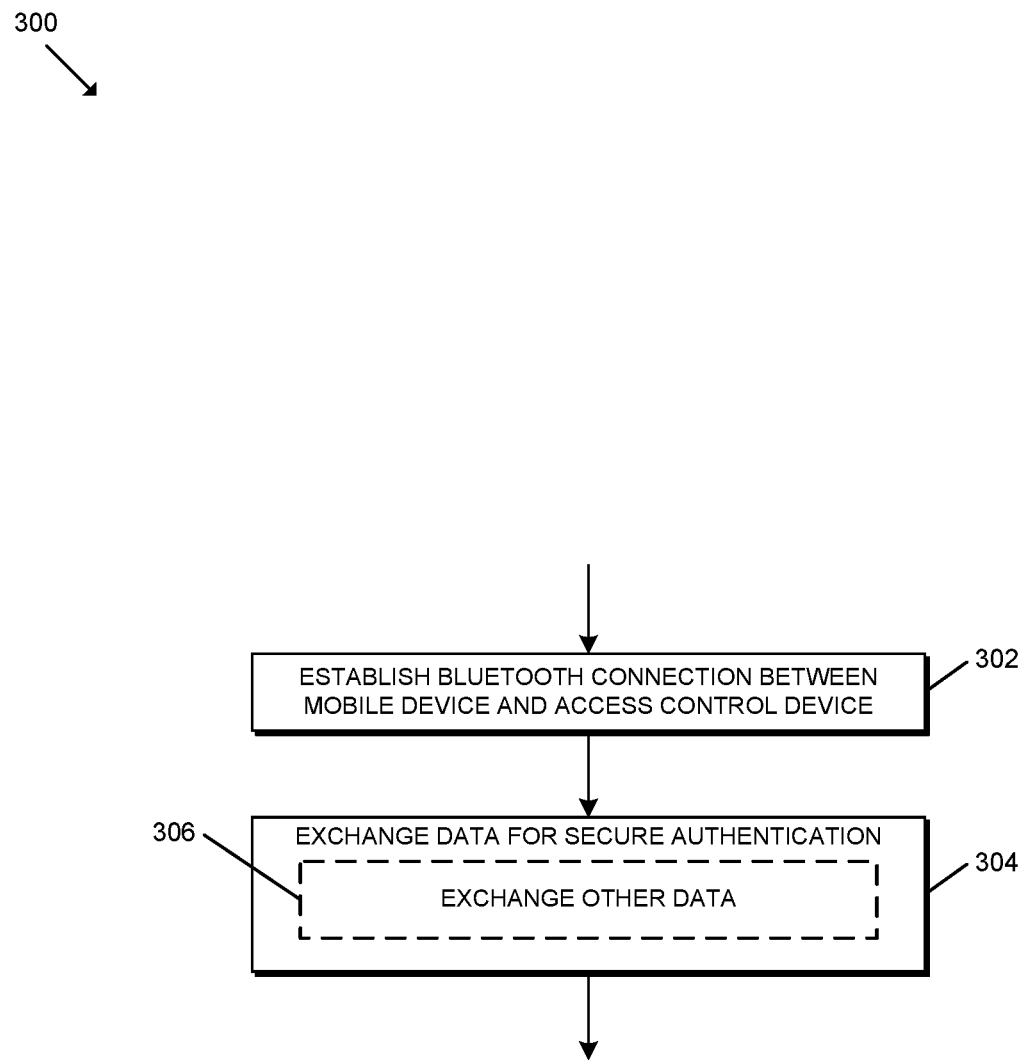
FIG. 3 is a simplified flow diagram of at least one embodiment of a method for performing an initial Bluetooth connection between the access control device and the mobile device of FIG. 1.

Referring now to FIG. 3, in use, the system 100 may execute a method 300 for performing an initial Bluetooth connection between the access control device 102 and the mobile device 104. It should be appreciated that the particular blocks of the method 300 are illustrated by way of example, and such blocks may be combined or divided, added or removed, and/or reordered in whole or in part depending on the particular embodiment, unless stated to the contrary.

The illustrative method 300 begins with block 302 in which the mobile device 104 and the access control device 102 establish a Bluetooth connection with one another (e.g., a full/standard Bluetooth connection). For example, in some embodiments, the mobile device 104 and the access control device 102 may establish a secure Bluetooth pairing with one another.

In block 304, the mobile device 104 and the access control device 102 exchange data for secure authentication. For example, in some embodiments, each of the mobile device 104 and the access control device 102 may generate (or have generated for it) a respective asymmetric cryptographic key pair including a public cryptographic key and corresponding private cryptographic key, and the devices 102, 104 may exchange the public keys with one another. Additionally, in the illustrative embodiment, the mobile device 104 may transmit a unique identifier of the mobile device 104 (e.g., a UUID) to the access control device 102. In some embodiments, the mobile device 104 and the access control device 102 may utilize Elliptic Curve Cryptography (ECC) and/or another suitable algorithm in performing the cryptographic functions described herein. For example, in some embodiments, the Elliptic Curve Digital Signature Algorithm (ECDSA) algorithm may be leveraged to perform the authentication described herein. Although the key exchange is described herein as involving an asymmetric cryptographic key pair, it should be appreciated that the mobile device 104 and the access control device 102 may generate a shared cryptographic key (e.g., a symmetric cryptographic key) in other embodiments. In block 306, the mobile device 104 and/or the access control device 102 may exchange other data over the established Bluetooth connection.

It should be appreciated that, in the illustrative embodiment, this initial establishing of the Bluetooth connection between the mobile device 104 and the access control device 102 to exchange data for establishing a subsequent cryptographically secure connection may be the only time that a Bluetooth connection is established. Each subsequent communication between those devices 102, 104 may be performed via Bluetooth advertisements (e.g., in the clear) without establishing a Bluetooth connection as described in greater detail below. It should be further appreciated that, in some embodiments, various information associated with one or more of the devices in the system 100 may be shared out-of-band. For example, in some embodiments, a programming code for the access control device 102 may be provided in a user manual or other documentation. Accordingly, future decryption attempts may be protected by augmenting challenges with some data that a man-in-the-middle would never explicitly see (e.g., without having access to the out-of-band component/information).

Although the blocks 302-306 are described in a relatively serial manner, it should be appreciated that various blocks of the method 300 may be performed in parallel in some embodiments.

Figure 4:
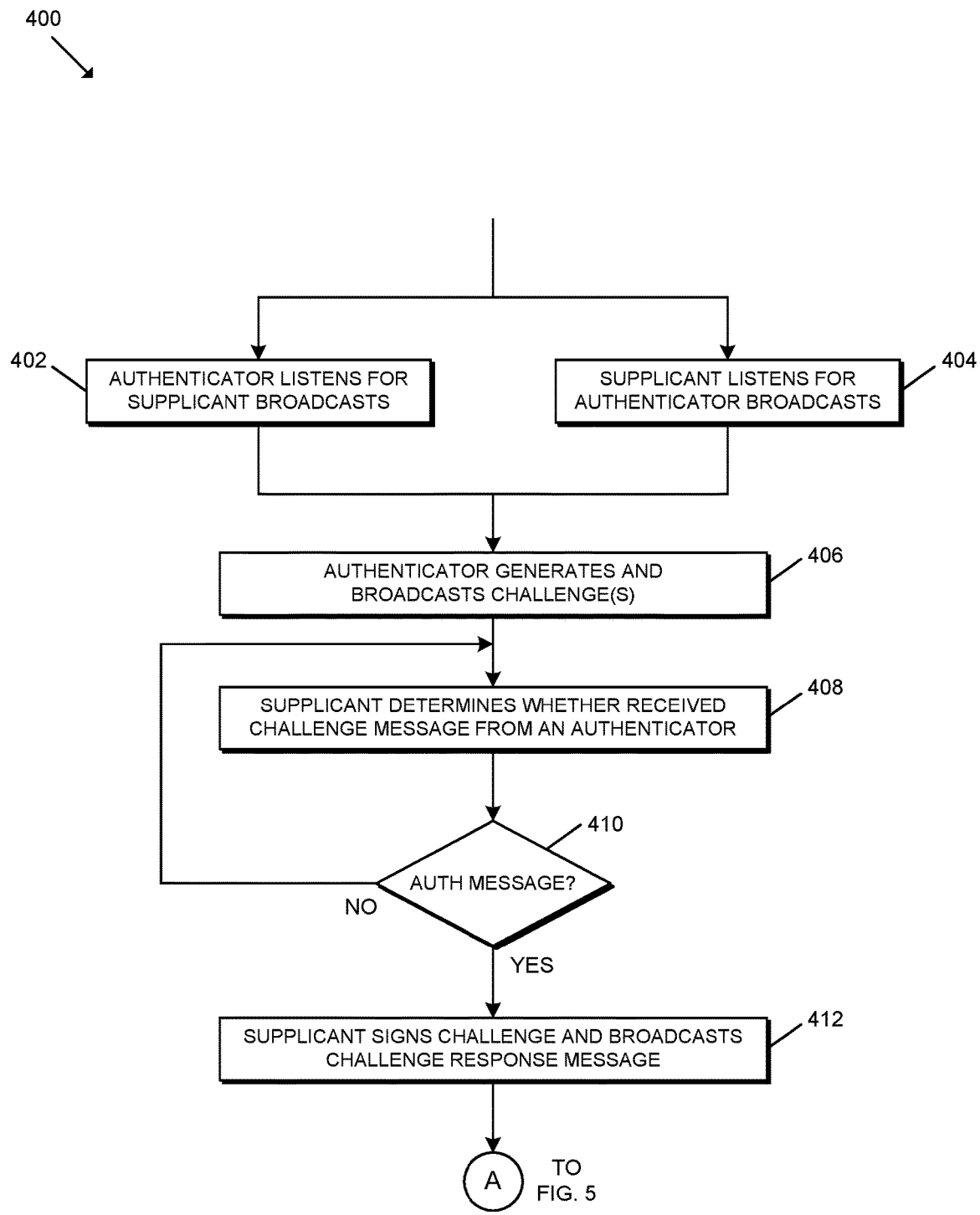
FIGS. 4-5 are a simplified flow diagram of at least one embodiment of a method for authenticating a supplicant via Bluetooth advertisements.
Figure 5:
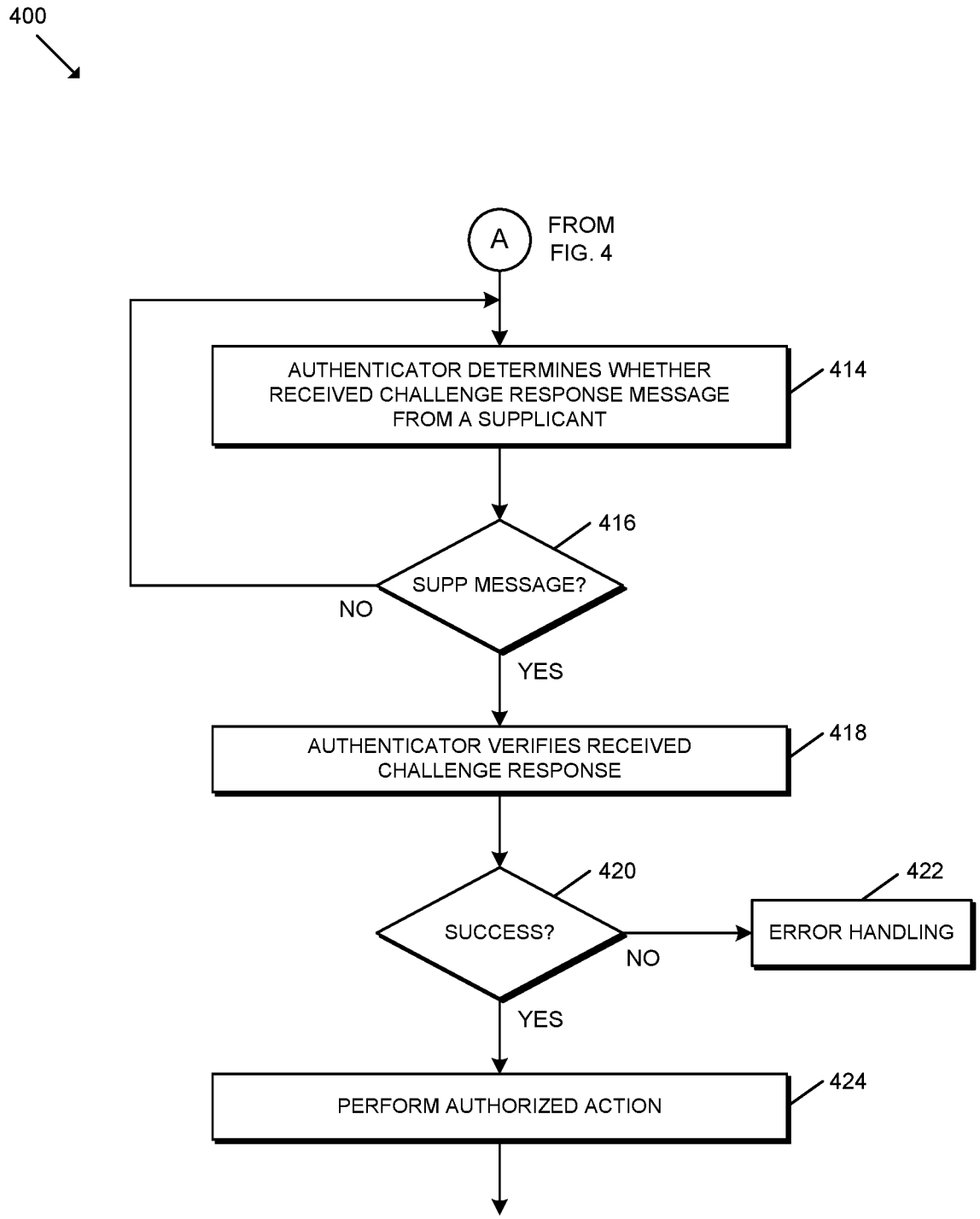

Referring now to FIGS. 4-5, in use, the system 100 may execute a method 400 for authenticating a supplicant via Bluetooth advertisements. It should be appreciated that the particular blocks of the method 300 are illustrated by way of example, and such blocks may be combined or divided, added or removed, and/or reordered in whole or in part depending on the particular embodiment, unless stated to the contrary.

In the illustrative embodiment, given that there may be no Bluetooth connection relationship between the devices 102, 104 after the initial connection described in reference to the method 300 of FIG. 3, there may no longer be a "central device" and "peripheral device" relationship between the connected devices (e.g., the access control device 102 and the mobile device 104) as described in reference to a Bluetooth protocol. As such, the device performing the authentication may be referred to herein as the "authenticator" (e.g., the access control device 102), and the device to be authenticated may be referred to herein as the "supplicant" (e.g., the mobile device 104).

The illustrative method 400 begins with block 402 in which the authenticator (e.g., the access control device 104) listens for broadcasts from the supplicant (e.g., the mobile device 104) and block 404 in which the supplicant listens for broadcasts from the authenticator. For example, as described below, the supplicant may transmit Bluetooth (e.g., BLE) advertisements. It should be appreciated that one or more devices (e.g., the authenticator) within the Bluetooth communication circuitry transmission range of the supplicant may listen for and receive such a Bluetooth advertisement from the supplicant. Similarly, the authenticator may transmit Bluetooth (e.g., BLE) advertisements, and one or more devices (e.g., the supplicant) within the Bluetooth communication circuitry transmission range of the authenticator may listen for receive such a Bluetooth advertisement from the authenticator.

It should be further appreciated that the blocks 402-404 may occur asynchronously and, therefore, those blocks 402-404 are depicted as occurring in parallel. In various embodiments, it should be appreciated that each of the devices 102, 104 may begin listening for advertisements broadcasted by the other device 102, 104 asynchronously and/or in a predefined order. In some embodiments, the authentication and/or the supplicant may begin listening for the corresponding broadcasts of the other device based on characteristics indicative of user intent to perform a particular action (e.g., unlock a lock mechanism of the access control device 102). For example, in some embodiments, the mobile device 104 (e.g., as a supplicant) may utilize a geofence or global positioning system (GPS) data indicative of a location of the mobile device 104 to determine when to begin listening for broadcasts of Bluetooth advertisements from the access control device 102 (e.g., when the mobile device 104 is within a threshold distance of the access control device 102, within a geofence associated with the access control device 102, etc.). Further, in some embodiments, the access control device 102 may access control device 102 may begin listening for broadcasts of Bluetooth advertisements from the mobile device 104 after a user touches the access control device 102 or portion thereof (e.g., based on capacitive/resistive sensing, acceleration, and/or other sensor data). In such embodiments, the access control device 102 (e.g., a bicycle lock) may be able to remain in a sleep state until touched, at which point it wakes up and begins advertising and listening for advertisements, which may improve battery life and responsiveness while reducing the risk of inadvertent access authorization. In another embodiment, the access control device 102 (e.g., when line powered) may always be advertising and/or listening for advertisements such that user intent may simply be initiated by an interaction with the mobile device 104 (e.g., automatically based on locations or other criteria, in response to the user's physical interaction with the phone, certain detection motion, etc.). It should be appreciated that the access control device 102 and/or the mobile device 104 may begin listening for Bluetooth advertisements in response to other suitable conditions in other embodiments (e.g., other conditions indicative of user intent to perform a particular action).

In block 406, the authenticator (e.g., the access control device 102) generates a challenge message/data (e.g., randomized or pseudorandomized challenge data) and broadcasts a Bluetooth advertisement including the challenge message/data. Although the Bluetooth advertisement may be described herein as a single advertisement for simplicity of the description, it should be appreciated that the authenticator may periodically transmit a Bluetooth advertisement including a challenge message/data receivable by any Bluetooth-capable device within the range of the authenticator. Further, in some embodiments, the particular challenge message/data may rotate and/or change after a threshold periodic of time (e.g., periodically), which may help to obviate replay and/or man-in-the-middle attacks on the system 100. In some embodiments, the challenge message/data may be embodied as one or more cryptographic challenges. Further, in some embodiments, it should be appreciated that the Bluetooth advertisements may utilize extended advertising in order to include more data than a "regular" length advertisement.

In block 408, the supplicant (e.g., the mobile device 104) receives the Bluetooth advertisement and determines whether the received challenge message/data was broadcasted by an authenticator (e.g., such as the access control device 102). For example, in some embodiments, the supplicant may analyze the Bluetooth advertisement to determine whether the advertisement includes a manufacturer data packet including the manufacturer identifier of the access control device 102, service data associated with a service it is interested in (e.g., via a UUID), and/or other data identifying the advertisement as originating from a relevant authenticator. If the supplicant determines, in block 410, that the Bluetooth advertisement was not transmitted by an authenticator, the method 400 may return to block 408. In other words, in some embodiments, the supplicant may wait to perform a further action with respect to the method 400 until it receives a relevant Bluetooth advertisement from an authenticator.

However, if the supplicant determines, in block 410, that the Bluetooth advertisement was transmitted by an authenticator (e.g., the access control device 102), the method 400 advances to block 412 in which the supplicant cryptographically signs the challenge message/data to generate a challenge response message/data including the signed challenge data and a unique identifier of the supplicant (e.g., a UUID of the mobile device 104), and broadcasts a Bluetooth advertisement including the challenge response message/data. Although the Bluetooth advertisement including the challenge response may be described herein as a single advertisement for simplicity of the description, it should be appreciated that the supplicant may periodically transmit a Bluetooth advertisement including a challenge response message/data receivable by any Bluetooth-capable device within the range of the authenticator for a period of time (e.g., before a timeout associated with the challenge message/data). In the illustrative embodiment, it should be appreciated that the supplicant may cryptographically sign the challenge data using the private key generated as part of the initial Bluetooth pairing with the authenticator (see block 304 of FIG. 3).

In block 414 of FIG. 5, the authenticator (e.g., the access control device 102) receives the Bluetooth advertisements broadcasted by the supplicant and determines whether the received challenge response message/data was broadcasted by a supplicant (e.g., such as the mobile device 104). For example, in some embodiments, the authenticator may analyze the Bluetooth advertisement in a manner similar to that described above in reference to block 408 of FIG. 4. If the authenticator determines, in block 416, that the Bluetooth advertisement was not transmitted by a supplicant, the method 400 may return to block 414. In other words, in some embodiments, the authenticator may wait to perform a further action with respect to the method 400 until it receives a relevant Bluetooth advertisement from a supplicant.

However, if the authenticator determines, in block 416, that the Bluetooth advertisement was transmitted by a supplicant (e.g., the mobile device 104), the method 400 advances to block 418 in which the authenticator verifies the received challenge response. For example, in some embodiments, the authenticator identifies a public cryptographic key associated with the supplicant (e.g., the mobile device 104) based on the identifier of the supplicant provided in/with the challenge response message and verifies the cryptographic signature of the challenge message/data using the public cryptographic key. In other words, in some embodiments, the authenticator (e.g., the access control device 102) may include a database or look-up table including various public cryptographic keys and associated supplicant identifiers (e.g., obtained during the initial Bluetooth pairing/connection described in reference to FIG. 3). If the authenticator determines, in block 420, that the validation of the signature (e.g., the signed challenge data) was successful, the method 400 advances to block 424 in which the authenticator may perform an authorized action on behalf of the supplication. However, if the authenticator is unable to validate the signature (e.g., due to not having the proper public cryptographic key), the method 400 may advance to block 422 in which one or more error handling procedures may be performed (e.g., terminating the method 400, transmitting an error notification to the authenticator/supplicant, etc.).

It should be appreciated that the authorized action may be any suitable action depending on the particular embodiment. For example, in some embodiments, the authenticator (e.g., the access control device 102) may unlock a lock mechanism included on, or otherwise associated with, the authenticator.

Although the blocks 402-424 are described in a relatively serial manner, it should be appreciated that various blocks of the method 400 may be performed in parallel in some embodiments.

What is claimed is:

1. A method of authenticating a mobile device over Bluetooth advertisements, the method comprising:
 establishing a Bluetooth protocol connection between the mobile device and an access control device;
 exchanging data for secure authentication between the mobile device and the access control device over the Bluetooth protocol connection;
 disconnecting the Bluetooth protocol connection between the mobile device and the access control device in response to exchanging the data for secure authentication between the mobile device and the access control device;
broadcasting, by the access control device while not connected with the mobile device and subsequent to exchanging the data for secure authentication, a first Bluetooth advertisement including a challenge message generated by the access control device;
receiving, by the mobile device while not connected with the access control device, the first Bluetooth advertisement including the challenge message;
broadcasting, by the mobile device while not connected with the access control device and subsequent to exchanging the data for secure authentication, a second Bluetooth advertisement including a challenge response message generated by the mobile device based on the challenge message;
receiving, by the access control device while not connected with the mobile device, the second Bluetooth advertisement including the challenge response message; and
determining, by the access control device while not connected with the mobile device, whether the mobile device is authorized to perform an action with respect to the access control device by verifying the challenge response message.

2. The method of claim 1, further comprising generating, by the mobile device, the challenge response message by cryptographically signing the challenge message with a private key of the mobile device.

3. The method of claim 2, wherein the challenge response message comprises a unique identifier of the mobile device.

4. The method of claim 3, wherein verifying the challenge response message comprises verifying the signed challenge message using a public key of the mobile device stored on the access control device.

5. The method of claim 4, wherein exchanging the data for secure authentication between the mobile device and the access control device comprises transmitting the unique identifier of the mobile device and the public key of the mobile device to the access control device.

6. The method of claim 5, wherein verifying the signed challenge message comprises identifying the public key of the mobile device stored on the access control device based on the unique identifier of the mobile device extracted from the challenge response message.

7. The method of claim 1, further comprising unlocking a lock mechanism associated with the access control device in response to verifying the challenge response message.

8. An access control system, comprising:
a supplicant device; and
an authenticator device configure to (i) establish a Bluetooth protocol connection with the supplicant device, (ii) exchange data for secure authentication with the supplicant device over the Bluetooth protocol connection, (iii) disconnect the Bluetooth protocol connection with the supplicant device in response to exchange of the data for secure authentication with the supplicant device, and (iv) broadcast a first Bluetooth advertisement including a challenge message generated by the authenticator device while not connected with the supplicant device and subsequent to exchange of the data for secure authentication with the supplicant device; and
wherein the supplicant device, while not connected with the authenticator device, is configured to (i) receive the first Bluetooth advertisement including the challenge message and (ii) broadcast, subsequent to exchange of the data for secure authentication with the supplicant device, a second Bluetooth advertisement including a challenge response message generated by the supplicant device based on the challenge message; and
wherein the authenticator device, while not connected with the supplicant device, is further configured to (i) receive the second Bluetooth advertisement including the challenge response message and (ii) verify the challenge response message to determine whether the supplicant device is authorized to perform an action with respect to the authenticator device.

9. The access control system of claim 8, wherein the supplicant device is configured to generate the challenge response message by cryptographically signing the challenge message with a private key of the supplicant device.

10. The access control system of claim 9, wherein the challenge response message comprises a unique identifier of the supplicant device.

11. The access control system of claim 10, wherein to verify the challenge response message comprises to verify the signed challenge message using a public key of the supplicant device stored on the authenticator device.

12. The access control system of claim 11, wherein to exchange the data for secure authentication of the supplicant device comprises to receive the unique identifier of the supplicant device and the public key of the supplicant device.

13. The access control system of claim 12, wherein to verify the signed challenge message comprises to identify the public key of the supplicant device stored on the authenticator device based on the unique identifier of the supplicant device extracted from the challenge response message.

14. The access control system of claim 8, wherein the supplicant device comprises a mobile device and the authenticator device comprises an access control device.

15. The access control system of claim 14, further comprising a lock mechanism associated with the access control device; and
wherein the access control device is configured to unlock the lock mechanism in response to verification of the challenge response message.

16. The access control system of claim 8, wherein the supplicant device comprises an access control device and the authenticator device comprises a mobile device.

17. An access control device, comprising:
at least one processor; and
at least one memory comprising a plurality of instructions stored thereon that, in response to execution by the at least one processor, causes the access control device to:
establish a Bluetooth protocol connection with a mobile device;
exchange data for secure authentication with the mobile device over the Bluetooth protocol connection;
disconnect the Bluetooth protocol connection with the mobile device in response to exchange of the data for secure authentication with the mobile device;
broadcast a first Bluetooth advertisement including a challenge message while not connected with the mobile device and subsequent to exchange of the data for secure authentication with the mobile device;
receive a second Bluetooth advertisement broadcasted by the mobile device in response to broadcasting the first Bluetooth advertisement while not connected with the mobile device and subsequent to exchange of the data for secure authentication with the mobile device, wherein the second Bluetooth advertisement includes a challenge response message generated by the mobile device based on the challenge message; and verify, while not connected with the mobile device, the challenge response message to determine whether the mobile device is authorized to perform an action with respect to the access control device.

18. The access control device of claim 17, wherein the challenge response message includes (i) a unique identifier of the mobile device and (ii) the challenge message cryptographically signed with a private key of the mobile device.

19. The access control device of claim 18, wherein to verify the challenge response message comprises to verify the signed challenge message using a public key of the mobile device stored on the access control device.

20. The access control device of claim 19,
wherein to exchange the data for secure authentication of the mobile device comprises to receive the unique identifier of the mobile device and the public key of the mobile device; and
wherein to verify the signed challenge message comprises to identify the public key of the mobile device stored on the access control device based on the unique identifier of the mobile device extracted from the challenge response message.

* * * * *